(12) United States Patent  (10) Patent No.: US 12,384,244 B2
Ueyama                    (45) Date of Patent:    Aug. 12, 2025

(54) AUTOMATIC SPEED CONTROL DEVICE, AUTOMATIC SPEED CONTROL METHOD, AND AUTOMATIC SPEED CONTROL PROGRAM

(71) Applicant: TOYOTA JIDOSHA KABUSHIKI KAISHA, Toyota (JP)

(72) Inventor: Masao Ueyama, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 507 days.

(21) Appl. No.: 17/690,144

(22) Filed: Mar. 9, 2022

(65) Prior Publication Data
US 2022/0305909 A1    Sep. 29, 2022

(30) Foreign Application Priority Data
Mar. 25, 2021 (JP) ................. 2021-052274

(51) Int. Cl.
*B60K 31/12*    (2006.01)
*B60K 31/00*    (2006.01)
(Continued)

(52) U.S. Cl.
CPC .......... *B60K 31/12* (2013.01); *B60K 31/0066* (2013.01); *B60W 30/146* (2013.01);
(Continued)

(58) Field of Classification Search
CPC ....... B60K 31/0083; B60K 2031/0091; B60W 30/146; B60W 10/04; B60W 10/18;
(Continued)

(56) References Cited

U.S. PATENT DOCUMENTS

2006/0190158 A1*  8/2006  Shiiba ............... B60K 31/0066
                                                    701/70
2009/0198426 A1*  8/2009  Yasui .................... B60W 10/11
                                                    701/70
2009/0287376 A1* 11/2009  Aso ........................ G05D 1/027
                                                     701/1
2012/0316744 A1* 12/2012  Shimura ............... F02D 29/02
                                                    701/72
(Continued)

FOREIGN PATENT DOCUMENTS

JP     H10-67255 A     3/1998
JP     2000-293782 A   10/2000
(Continued)

*Primary Examiner* — Anne Marie Antonucci
(74) *Attorney, Agent, or Firm* — Oliff PLC

(57) ABSTRACT

An automatic speed control device includes: an upper limit lateral acceleration degree setting part for setting an upper limit lateral acceleration degree; a road curvature acquiring part for acquiring a value of a curvature parameter relating to curvature of a road; an upper limit speed setting part for calculating a speed of the vehicle at which if the vehicle runs on that road, the lateral acceleration degree of the vehicle becomes the upper limit lateral acceleration degree and setting the calculated speed as the upper limit speed; and a speed control part for controlling the speed of the vehicle to be less than or equal to the upper limit speed. The upper limit lateral acceleration degree when running on a connecting road is set lower than the upper limit lateral acceleration degree when running on a main road of a motorway.

6 Claims, 7 Drawing Sheets

(51) Int. Cl.
  *B60W 30/14* (2006.01)
  *B60W 10/04* (2006.01)
  *B60W 10/18* (2012.01)
  *B60W 10/20* (2006.01)

(52) U.S. Cl.
  CPC ...... *B60K 2031/0091* (2013.01); *B60W 10/04* (2013.01); *B60W 10/18* (2013.01); *B60W 10/20* (2013.01); *B60W 2520/04* (2013.01); *B60W 2520/125* (2013.01); *B60W 2552/05* (2020.02); *B60W 2552/30* (2020.02); *B60W 2720/106* (2013.01)

(58) Field of Classification Search
  CPC ............. B60W 10/20; B60W 2520/04; B60W 2520/125; B60W 2552/05; B60W 2552/30; B60W 2720/106; B60W 2720/10; B60W 2720/125; B60W 30/18145; B60W 50/0097; B60W 30/143; B60W 10/06; B60W 10/08; B60W 2420/403; B60W 2420/408; B60W 2520/10; B60W 2520/105; B60W 2554/80
  USPC .......................................................... 701/93
  See application file for complete search history.

(56) References Cited

U.S. PATENT DOCUMENTS

| | | | |
|---|---|---|---|
| 2015/0127200 A1* | 5/2015 | Takeuchi | B60K 6/445 |
| | | | 701/22 |
| 2016/0347175 A1* | 12/2016 | Yamashita | B60W 30/18163 |
| 2018/0257698 A1* | 9/2018 | Ryne | G05B 13/0265 |
| 2018/0345953 A1 | 12/2018 | Mizoguchi | |
| 2018/0345967 A1 | 12/2018 | Oniwa | |
| 2019/0031191 A1 | 1/2019 | Satoh et al. | |
| 2019/0092346 A1* | 3/2019 | Odate | B62D 6/007 |
| 2020/0247412 A1* | 8/2020 | Wang | B60W 50/14 |
| 2020/0307593 A1* | 10/2020 | Hirosawa | B60W 10/04 |
| 2021/0179096 A1* | 6/2021 | Shalev-Shwartz | B60T 7/22 |
| 2022/0266869 A1 | 8/2022 | Ito et al. | |

FOREIGN PATENT DOCUMENTS

| | | | | |
|---|---|---|---|---|
| JP | 2001-012958 A | 1/2001 | | |
| JP | 2010-089700 A | 4/2010 | | |
| JP | 2018-203006 A | 12/2018 | | |
| JP | 2018-203084 A | 12/2018 | | |
| JP | 2020-082749 A | 6/2020 | | |
| WO | 2017/145555 A1 | 8/2017 | | |
| WO | WO-2020230308 A1 * | 11/2020 | ............ | B60W 30/12 |

* cited by examiner

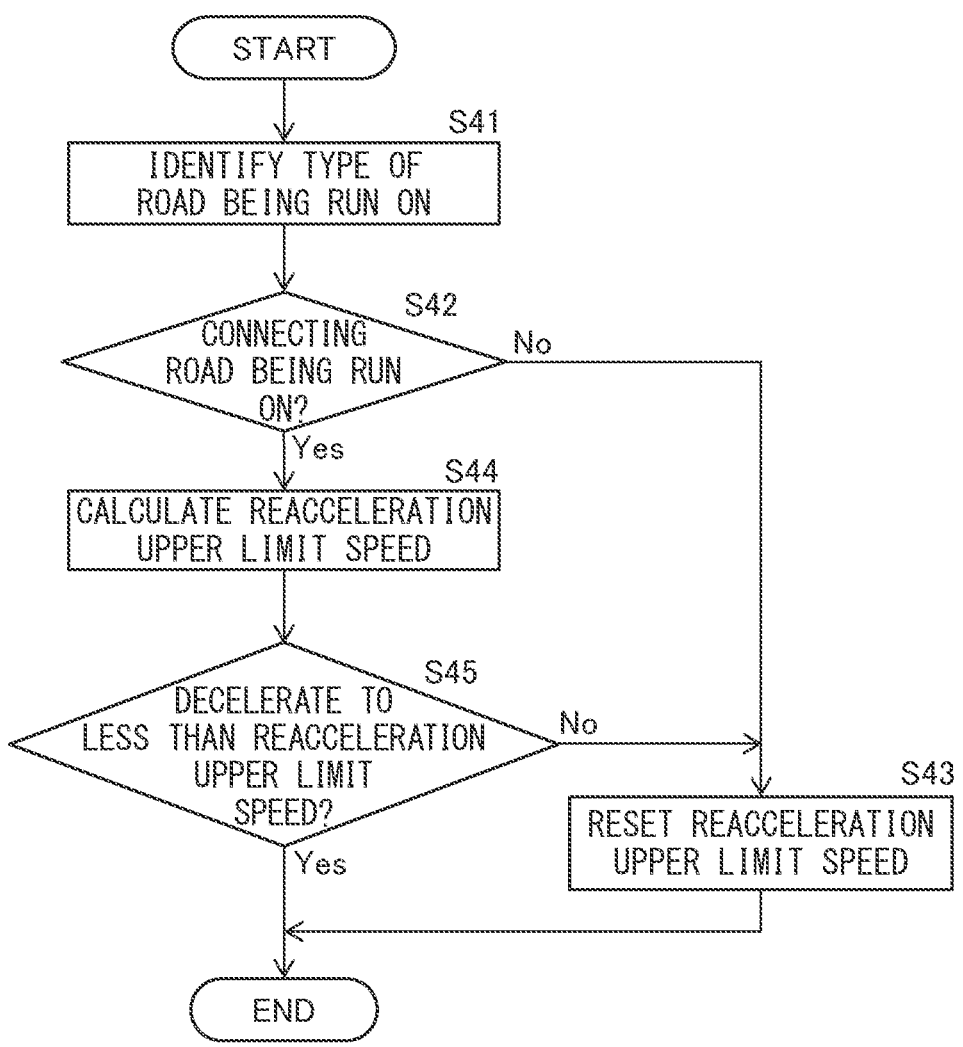

AUTOMATIC SPEED CONTROL DEVICE, AUTOMATIC SPEED CONTROL METHOD, AND AUTOMATIC SPEED CONTROL PROGRAM

FIELD

The present disclosure relates to an automatic speed control device, automatic speed control method, and automatic speed control program.

BACKGROUND

In the past, an automatic speed control device for automatically controlling the speed of a vehicle has been proposed (JP 2018-203006 A, JP 2000-293782 A, and WO 2017/145555 A). In particular, in the device described in JP 2018-203006 A, if the curvature of the road on which the vehicle intends to run is large, the target speed is made to fall so as to make a lateral acceleration degree applied to the vehicle less than or equal to a constant value without the vehicle departing from the target path.

SUMMARY

In JP 2018-203006 A, the speed of the vehicle is controlled so that the lateral acceleration degree becomes less than or equal to a constant value regardless of the type of the road on which the vehicle is running. However, for example, the road width of a connecting road of a motorway (road between main roads or road between a main road and an ordinary road) is generally narrower than a road width of a motorway. Further, if the road width is narrow, even if the speed of the vehicle is the same, it tends to be difficult make the occupants feel at ease. If the upper limit lateral acceleration degree is set to a constant value matched with the main road, there is a possibility of the vehicle being unnecessarily high in speed while running on the connecting road. Conversely, if the upper limit lateral acceleration degree is set to a constant value matched with the connecting road, there is a possibility of the speed of the vehicle being unnecessarily limited while running on the main road.

Considering the above technical problem, an object of the present disclosure is to provide an automatic speed control device able to control the speed of a vehicle so that a lateral acceleration degree of the vehicle is suitable, regardless of the type of the road on which the vehicle is running.

The present invention has as its gist the following.

(1) An automatic speed control device for automatically controlling a speed of a vehicle, the automatic speed control device comprising:
an upper limit lateral acceleration degree setting part for setting an upper limit lateral acceleration degree which is an upper limit value of a lateral acceleration degree allowed while the vehicle is running;
a road curvature acquiring part for acquiring a value of a curvature parameter relating to curvature of a road on which the vehicle is scheduled to run;
an upper limit speed setting part for calculating a speed of the vehicle at which if the vehicle runs on that road, the lateral acceleration degree of the vehicle becomes the upper limit lateral acceleration degree, based on the curvature parameter of the road, and setting the calculated speed as the upper limit speed; and
a speed control part for controlling the speed of the vehicle to be less than or equal to the upper limit speed, wherein
the upper limit lateral acceleration degree setting part sets the upper limit lateral acceleration degree when the vehicle is running on a connecting road merging with a main road of a motorway or a connecting road branching off from a main road, lower than the upper limit lateral acceleration degree when the vehicle is running on a main road of a motorway.

(2) The automatic speed control device according to above (1), wherein the upper limit speed setting part
sets a predetermined reference upper limit speed as an upper limit speed when a speed of the vehicle corresponding to the upper limit lateral acceleration degree is faster than the reference upper limit speed, and
if, while running on the connecting road, the vehicle is decelerated until the lateral acceleration degree becomes less than a predetermined reacceleration upper limit speed, then is reaccelerated, sets the reacceleration upper limit speed as an upper limit speed when a speed of the vehicle corresponding to the upper limit lateral acceleration degree is faster than the reacceleration upper limit speed, and
the reacceleration upper limit speed is lower than the reference upper limit speed.

(3) The automatic speed control device according to above (2), wherein
the vehicle is a vehicle in which automatic control of the speed of the vehicle is stopped at an exit of a motorway, and
the upper limit speed setting part sets the reacceleration upper limit speed when the vehicle is running on a connecting road heading toward the exit, lower than the reacceleration upper limit speed when the vehicle is running on a connecting road merging with a main road.

(4) The automatic speed control device according to any one of above (1) to (3), wherein
the vehicle is a vehicle in which automatic control of the speed of the vehicle is stopped at an exit of a motorway, and
the upper limit lateral acceleration degree setting part sets the upper limit lateral acceleration degree when the vehicle is running on a connecting road heading toward the exit, lower than the upper limit lateral acceleration degree when the vehicle is running on a connecting road merging with a main road.

(5) The automatic speed control device according to any one of above (1) to (4), wherein the upper limit lateral acceleration degree setting part sets the upper limit lateral acceleration degree when the vehicle is running on a main road where a distance until the main road exit with no connecting road is less than or equal to the predetermined distance, lower than the upper limit lateral acceleration degree when the vehicle is running on a main road where a distance until the main road exit is longer than the predetermined distance.

(6) An automatic speed control method for automatically controlling a speed of a vehicle, the automatic speed control method comprising:
setting an upper limit lateral acceleration degree which is an upper limit value of a lateral acceleration degree allowed while the vehicle is running;
acquiring a value of a curvature parameter relating to curvature of a road on which the vehicle is scheduled to run;
calculating a speed of the vehicle at which if the vehicle runs on that road, the lateral acceleration degree of the vehicle becomes the upper limit lateral acceleration degree, based on the curvature parameter of the road, and setting the calculated speed as the upper limit speed; and controlling the speed of the vehicle to be less than or equal to the upper limit speed, wherein the upper limit lateral acceleration degree when the vehicle is running on a connecting road merging with a main road of a motorway or a connecting road branching off from a main road is lower than the upper limit lateral acceleration degree when the vehicle is running on a main road of a motorway.

(7) An automatic speed control program for automatically controlling a speed of a vehicle, the automatic speed control program causing a computer to execute a process comprising:

setting an upper limit lateral acceleration degree which is an upper limit value of a lateral acceleration degree allowed while the vehicle is running;

acquiring a value of a curvature parameter relating to curvature of a road on which the vehicle is scheduled to run;

calculating a speed of the vehicle at which if the vehicle runs on that road, the lateral acceleration degree of the vehicle becomes the upper limit lateral acceleration degree, based on the curvature parameter of the road, and setting the calculated speed as the upper limit speed; and controlling the speed of the vehicle to be less than or equal to the upper limit speed, wherein the upper limit lateral acceleration degree when the vehicle is running on a connecting road merging with a main road of a motorway or a connecting road branching off from a main road is lower than the upper limit lateral acceleration degree when the vehicle is running on a main road of a motorway.

BRIEF DESCRIPTION OF DRAWINGS

FIG. 9 is a flow chart showing a flow of processing for calculating a reacceleration upper limit speed performed at step S23 of FIG. 5.

DESCRIPTION OF EMBODIMENTS

Figure 1:
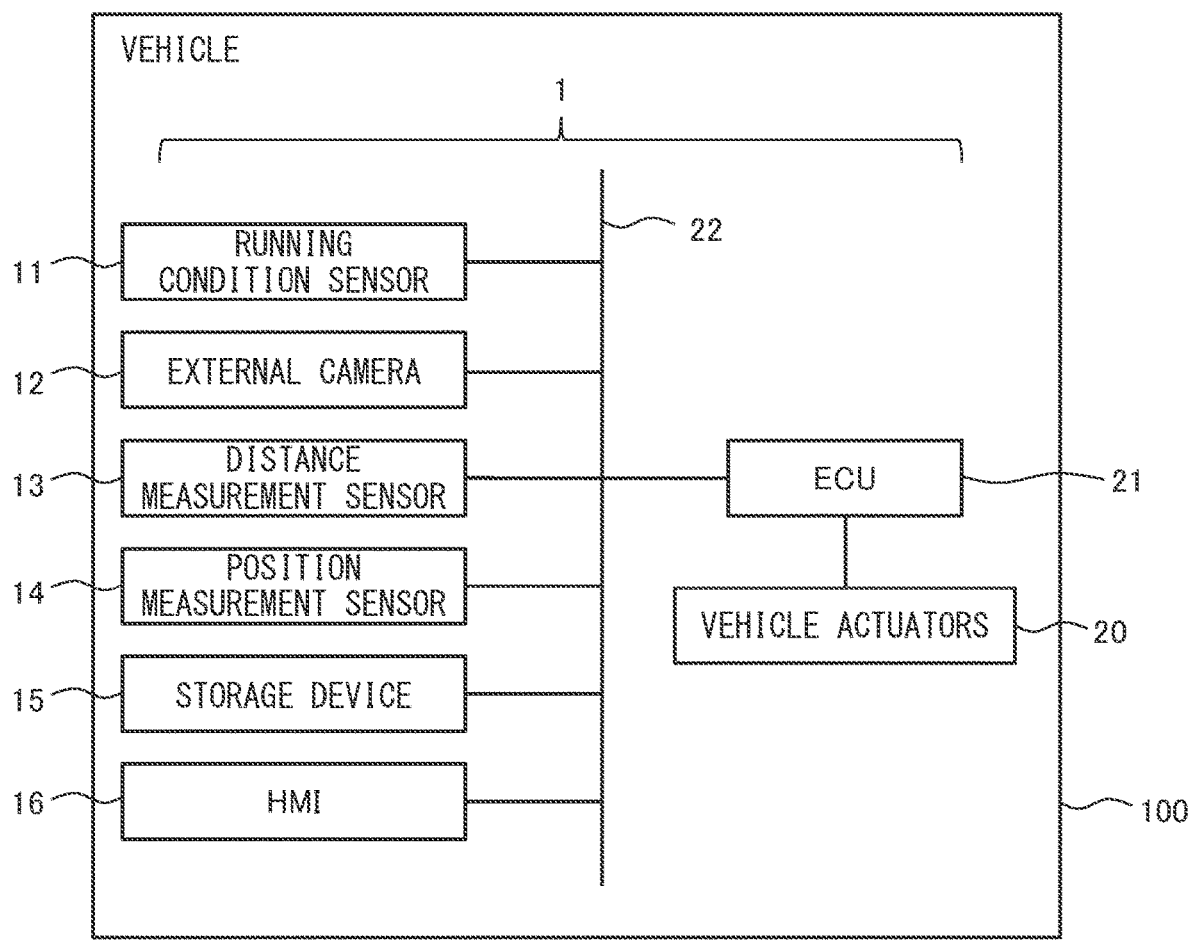
FIG. 1 is a view of the configuration schematically showing a vehicle in which an automatic speed control system according to one embodiment is mounted.

Below, embodiments will be explained in detail referring to the drawings. Note that, in the following explanation, similar components are assigned the same reference notations.

Configuration of Vehicle

FIG. 1 is a view of the configuration schematically showing a vehicle 100 in which an automatic speed control system 1 according to one embodiment is mounted. The automatic speed control system 1 is mounted in the vehicle 100 and automatically controls the speed of the vehicle 100 under predetermined circumstances. In the present embodiment, the automatic speed control system 1 has a running condition sensor 11, external camera 12, distance measurement sensor 13, position measurement sensor 14, storage device 15, human machine interface (below, referred to as "HMI") 16, vehicle actuators 20, and an electronic control unit (below, "ECU") 21.

However, the automatic speed control system 1 need not necessarily have all of them. For example, the automatic speed control system 1 need not have the distance measurement sensor 13 if having the external camera 12.

The running condition sensor 11, external camera 12, distance measurement sensor 13, position measurement sensor 14, storage device 15, HMI 16, and ECU 21 are connected to be able to communicate through an internal network 22. The internal network 22 is a network based on the CAN (Controller Area Network) or other standard. Further, the ECU 21 is connected through signal wires to the vehicle actuators 20.

The running condition sensor 11 is a sensor detecting the running condition of the vehicle 100. The running condition sensor 11 is, for example, an inertia measurement sensor and detects a speed, an acceleration degree, or the like of the vehicle 100. The running condition sensor 11 outputs the detection results of the running conditions of the vehicle through the internal network 22 to the ECU 21.

The external camera 12 is a device for capturing an image of the surroundings of the vehicle. The external camera 12 has a 2D detector (CCD, C-MOS, etc.) configured by an array of photoelectric conversion devices having sensitivity to visible light, and an image-forming optical system forming, on the 2D detector, an image of a region to be captured. In the present embodiment, the external camera 12 is attached for example inside the vehicle 100 so as to face forward of the vehicle 100. The external camera 12 captures the region in front of the vehicle 100 every predetermined capturing period (for example 1/30 second to 1/10 second), and generates an image showing that front region. The external camera 12 outputs the generated image through the internal network 22 to the ECU 21, every time generating an image. Note that, the external camera 12 may be a single lens camera or may be a stereo camera. If a stereo camera is used as the external camera 12, the external camera 12 also functions as a distance measurement sensor 13. The vehicle 100 may be provided with a plurality of external cameras differing in capture direction or focal distance.

The distance measurement sensor 13 is a sensor measuring the distance to an object present in the surroundings of the vehicle 100. In the present embodiment, the distance measurement sensor 13 can also measure an azimuth of the object present in the surroundings of the vehicle 100. The distance measurement sensor 13 is, for example, a milliwave radar or other radar, a LiDAR, or sonar. In the present embodiment, the distance measurement sensor 13 measures the distance to an object present in front of the vehicle. The distance measurement sensor 13 outputs the measurement result of the distance to an object in the surroundings, every predetermined period, through the internal network 22 to the ECU 21.

The position measurement sensor 14 is a sensor measuring a self-position of the vehicle 100. The position measurement sensor 14 is, for example, a GNSS (Global Navigation Satellite System) receiver. The GNSS receiver receives signals with time information from a plurality of position measurement satellites, and measures the self-position of the vehicle 100 based on the received signals. The position measurement sensor 14 outputs the self-position information of the vehicle 100, every predetermined period, through the internal network 22 to the ECU 21.

The storage device 15 has, for example, a hard disk drive or a nonvolatile semiconductor memory. The storage device 15 stores map information. The map information includes, for every predetermined section of a road, information indicating the position of that section and road signs (for example, lane defining lines or stop lines). The storage device 15 reads out map information in accordance with a readout request of map information from the ECU 21 and transmits the map information through the internal network 22 to the ECU.

The HMI 16 notifies notification information received through the internal network 22 from the ECU 21 to the driver of the vehicle 100. Therefore, the HMI 16 functions as a notification device notifying that information to the driver. Specifically, the HMI 17 has, for example, a display device such as a liquid crystal display, a meter such as a speedometer, warning lights, or speakers. Further, the HMI 16 receives input from the occupants, and sends the received input through the internal network 22 to the ECU 21. Therefore, the HMI 16 functions as an input device for receiving input from a passenger or the driver. Specifically, the HMI 16 has a touch panel, switches, buttons, or a remote controller. The HMI 16 is, for example, provided at the instrument panel.

The vehicle actuators 20 are actuators used for controlling the operation of the vehicle 100. Specifically, the vehicle actuators 20 include, for example, a drive actuator for controlling an internal combustion engine or electric motor for driving the vehicle 100, and a brake actuator for controlling brakes braking the vehicle 100. The vehicle actuators 20 may also include a steering actuator for controlling steering of the vehicle 100. The vehicle actuators 20 control acceleration and braking of the vehicle 100, and control steering of the vehicle 100 when having a steering actuator, in accordance with control signals sent from the ECU 21 through signal wires.

Figure 2:
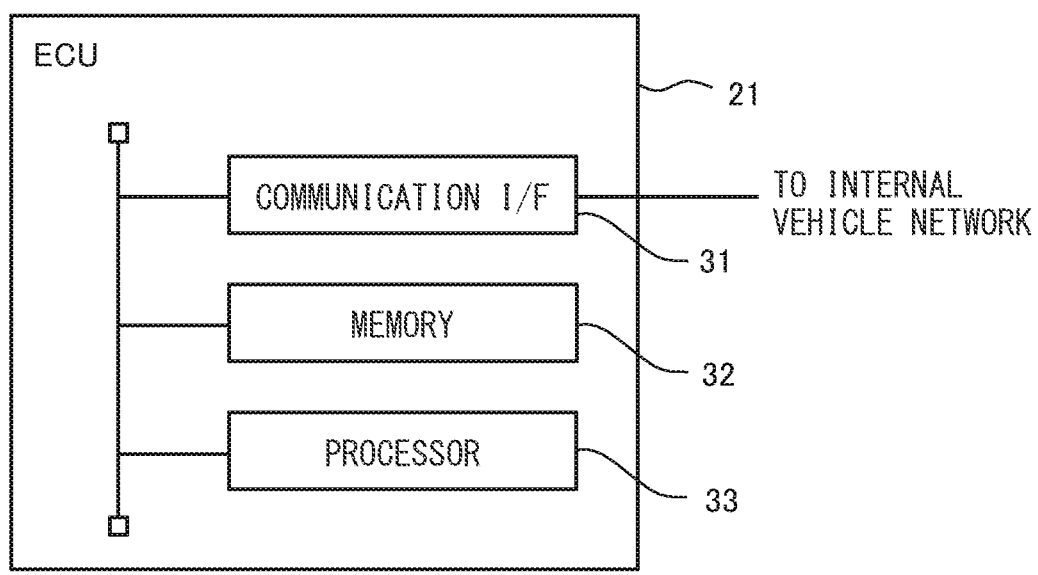
FIG. 2 is a view of a hardware configuration of an ECU according to one embodiment.

FIG. 2 is a view of the hardware configuration of the ECU 21 according to one embodiment. The ECU 21 has a communication interface 31, memory 32, and processor 33. Note that, the communication interface 31, memory 32, and processor 33 may be separate circuits, or may be configured as a single integrated circuit.

The communication interface 31 has a communication interface circuit and a device interface circuit. The communication interface circuit is a circuit for connecting the ECU 21 to the internal network 22. The device interface circuit is a circuit for outputting control signals to the vehicle actuators 20.

The communication interface 31 transmits received detection results of the running conditions of the vehicle 100 to the processor 33, each time receiving detection results from the running condition sensor 11. Further, it sends a received image to the processor 33, each time receiving an image from the external camera 12. In addition, the communication interface 31 transmits measurement results of the distance to an object in the surroundings of the vehicle to the processor 33, each time receiving measurement results from the distance measurement sensor 13. Furthermore, the communication interface 31 transmits the measurement results of the self-position to the processor 33, each time receiving the measurement results from the position measurement sensor 14. Further, the communication interface 31 transmits a high precision map read from the storage device 15 to the processor 33. In addition, the communication interface 31 transmits the input signal of an occupant to the processor 33, every time receiving the input signal from the HMI 16. Furthermore, the communication interface 31 transmits information for notifications to the HMI 16, every time receiving such information from the ECU 21. In addition, the communication interface 31 transmits control signals to the vehicle actuators 20, every time receiving such control signals to the vehicle actuators 20 from the ECU 21.

The memory 32 is a storage device for storing data. The memory 32 includes, for example, a volatile semiconductor memory and a nonvolatile semiconductor memory. The memory 32 stores a program for the speed control processing performed by the processor 33 of the ECU 21. Further, the memory 32 stores images captured by the external camera 12, operating information by the driver, measurement results of the distance to an object in the surroundings of the vehicle, measurement results of the self-position, input information of the occupants, and various types of data used in the speed control processing.

The processor 33 has one or more CPUs (central processing units) and their peripheral circuits. The processor 33 may further have a logic unit or arithmetic unit or other such processing circuit. The processor 33 performs control processing of the vehicle actuators 20 to control the vehicle actuators 20. In the present embodiment, the processor 33 functions as an automatic speed control device for automatically controlling the speed of the vehicle 100.

Figure 3:
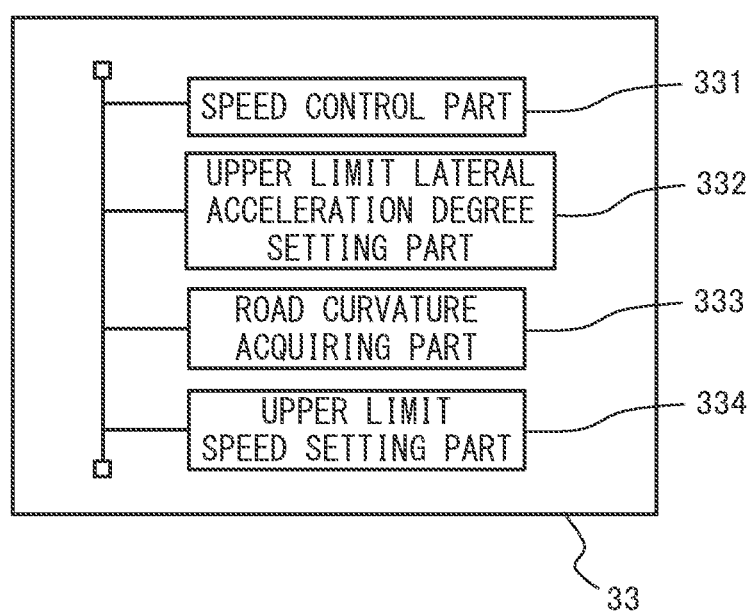
FIG. 3 is a functional block diagram of a processor of the ECU.

FIG. 3 is a functional block diagram of the processor 33 of the ECU 21. As shown in FIG. 3, the processor 33 has a speed control part 331 for automatically controlling the speed of the vehicle 100 based on an upper limit speed, an upper limit lateral acceleration degree setting part 332 for setting an upper limit lateral acceleration degree as an upper limit value of a lateral acceleration degree allowed while the vehicle 100 is running, a road curvature acquiring part 333 for acquiring a curvature of a road on which the vehicle 100 is scheduled to run, and an upper limit speed setting part 334 for calculating a speed of the vehicle whereby the lateral acceleration degree of the vehicle 100 becomes an upper limit lateral acceleration degree if the vehicle 100 is running on that road based on the curvature of the road scheduled to be run on, and setting the calculated speed as the upper limit speed. These functional blocks of the processor 33 are functional modules realized by for example a computer program running on the processor 33. Alternatively, these functional blocks of the processor 33 may be dedicated processing circuits provided at the processor 33. Details of the functional blocks of the processor 33 of the vehicle 100 will be explained later.

Summary of Speed Control

Next, speed control processing of the vehicle 100 by the speed control device according to the present embodiment will be explained. First, the processor 33 of the ECU 21 functioning as the speed control device according to the present embodiment automatically controls the speed of the vehicle 100 even without the driver operating the accelerator or the brakes, when the driver selects automatic speed control through the HMI 16. The automatic speed control here may be control requiring monitoring by the driver (for example, adaptive cruise control (ACC)) or may be part of control not requiring monitoring by the driver. Further, the processor 33 may also automatically control the steering of the vehicle 100 so that the vehicle 100 automatically runs along the lane on which the vehicle 100 is currently running, when the driver selects automatic speed control.

In the present embodiment, the automatic speed control of the vehicle 100 is performed while the vehicle 100 is running on a motorway (for example, highway or other road where main roads are connected not by intersections having traffic lights, but by connecting roads at interchanges, junctions, or the like) Therefore, if the vehicle 100 passes through an exit of a motorway, operation in relation to speed control is switched to the driver and automatic speed control is suspended. Similarly, the automatic steering control of the vehicle 100 may also be performed while the vehicle 100 is running on a motorway. In this case, if the vehicle 100 passes through an exit of the motorway, operation in relation to steering control is switched to the driver and automatic steering control is suspended.

In automatic speed control, the speed control part 331 basically sets the target speed of the vehicle 100 to the upper limit speed. However, if there is a preceding vehicle present in a running lane in which the vehicle 100 is running, the speed control part 331 controls the target speed of the vehicle 100 so as to follow that preceding vehicle. In particular, in the present embodiment, if the following distance between the vehicle 100 and the preceding vehicle is longer than a target following distance, the speed control part 331 sets the target speed of the vehicle 100 to a speed faster than the speed of the preceding vehicle. On the other hand, if the following distance between the vehicle 100 and the preceding vehicle is shorter than the target following distance, the speed control part 331 sets the target speed of the vehicle 100 to a speed slower than the speed of the preceding vehicle. However, if the target speed of the vehicle 100 set in this way is faster than the upper limit speed, the speed control part 331 sets the target speed of the vehicle 100 to the upper limit speed. Therefore, the speed control part 331 controls the speed of the vehicle 100 so as to be less than or equal to the upper limit speed.

Figure 4:
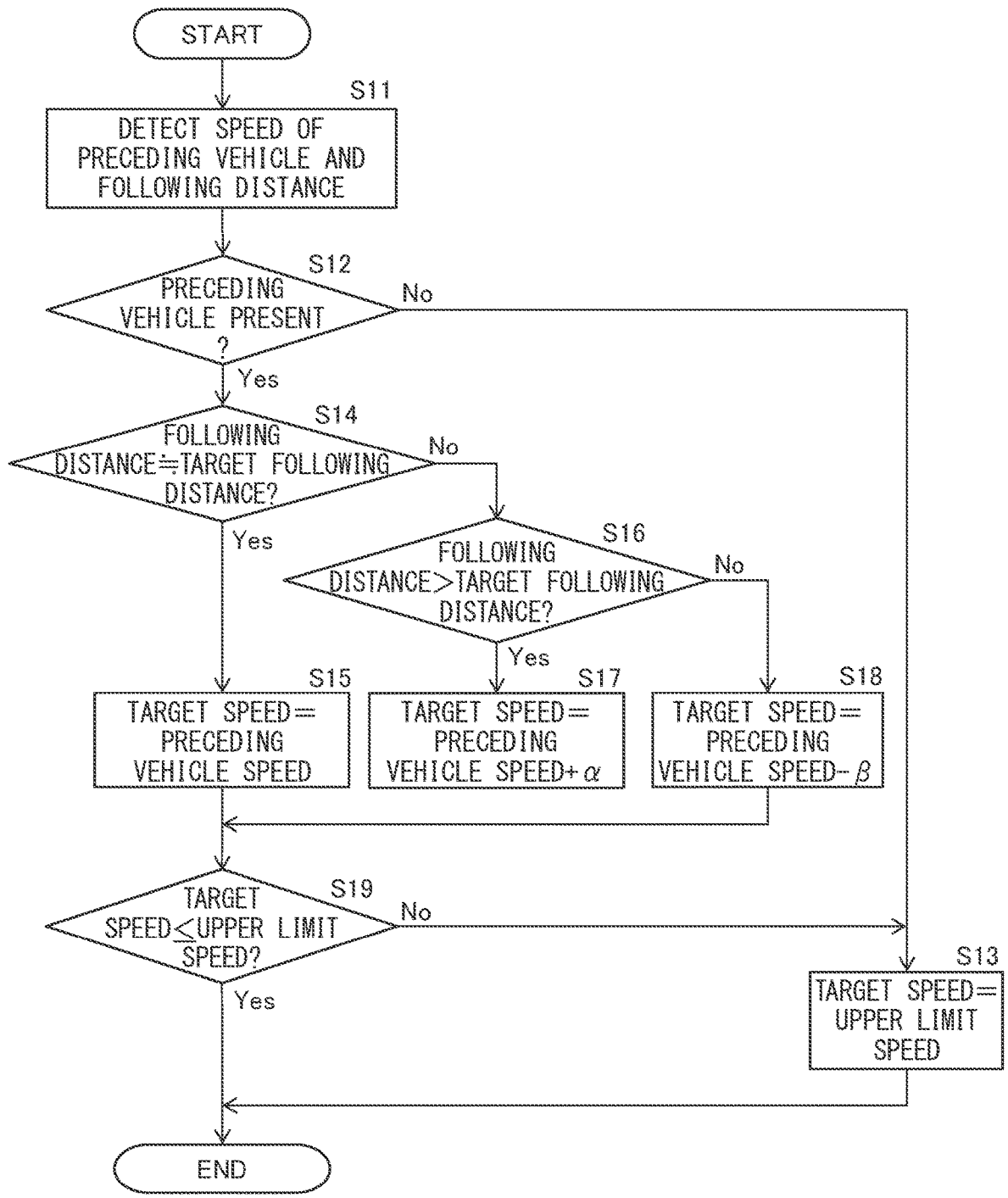
FIG. 4 is a flow chart showing a flow of speed control processing performed by a speed control part.

FIG. 4 is a flow chart showing a flow of speed control processing performed by the speed control part 331. The illustrated processing is repeatedly performed every constant time interval.

The speed control part 331 first detects the speed of the preceding vehicle and the following distance with the preceding vehicle (step S11). Specifically, the speed control part 331 first recognizes other vehicles running around the vehicle 100, based on images captured by the external camera 12 or distance information obtained by the distance measurement sensor 13. The other vehicles are recognized by known pattern recognition techniques such as a neural network (NN) or a support vector machine (SVM). Further, the speed control part 331 calculates the speeds of the recognized other vehicles and the following distances between the recognized other vehicles and the vehicle 100, based on the images captured by the external camera 12 or the distance information obtained by the distance measurement sensor 13.

Next, the speed control part 331 judges whether there is a preceding vehicle present in the running lane on which the vehicle 100 is running (step S12). Specifically, the speed control part 331 recognizes the shape of the lane on which the vehicle 100 is running, based on images captured by the external camera 12 or based on self-position information measured by the position measurement sensor 14 and map information stored in the storage device 15, and judges whether there is a preceding vehicle present in the running lane of the vehicle 100 based on the recognized shape of the lane and the position information of the other vehicles recognized at step S11. If at step S12 it is judged that there is a preceding vehicle present in the running lane of the vehicle 100, the speed control part 331 sets the target speed of the vehicle 100 to the upper limit speed calculated by the later mentioned upper limit speed setting part 334 (step S13).

On the other hand, if at step S12 it is judged that there is a preceding vehicle present in the running lane on which the vehicle 100 is running, the speed control part 331 judges if the following distance between the vehicle 100 and the preceding vehicle is substantially the same as the target following distance (step S14). The target following distance may be a preset constant value or may be a constant value preset by the driver. Further, the target following distance may also be a value changing in accordance with a parameter such as the speed of the vehicle 100 (for example, the target following distance becomes longer as the speed of the vehicle 100 becomes faster).

If at step S14 it is judged that the following distance between the vehicle 100 and the preceding vehicle is substantially the same as the target following distance, the speed control part 331 sets the target speed at a speed substantially the same as the speed of the preceding vehicle (step S15).

On the other hand, if at step S14 it is judged that the following distance between the vehicle 100 and the preceding vehicle differs from the target following distance, the speed control part 331 judges if the following distance is longer than the target following distance (step S16). If at step S16 it is judged that the following distance is longer than the target following distance, the speed control part 331 sets target speed to a speed faster than the speed of the preceding vehicle (step S17). On the other hand, if at step S16 it is judged that the following distance is shorter than the target following distance, the speed control part 331 sets the target speed at a speed slower than the speed of the preceding vehicle (step S18).

If at steps S15, S17, and S18 the target speed is set based on the speed of the preceding vehicle, the speed control part 331 judges if the set target speed is less than or equal to the upper limit speed calculated by the upper limit speed setting part 334 (step S19). If it is judged that the set target speed is less than or equal to the upper limit speed, the target speed is maintained without change. On the other hand, if at step S19 it is judged that the set target speed is faster than the upper limit speed, the speed control part 333 sets the target speed to the upper limit speed (step S13).

The ECU 21 of the vehicle 100 controls the vehicle actuators 20 so that the speed of the vehicle 100 becomes the target speed set as above. Therefore, when the current speed of the vehicle 100 is slower than the target speed, the ECU 21 controls the vehicle actuators 20 so that the vehicle 100 accelerates. In particular, the ECU 21 controls the vehicle actuators 20 so as to make the vehicle 100 accelerate by an acceleration degree less than or equal to a preset upper limit acceleration degree. On the other hand, when the current speed of the vehicle 100 is faster than the target speed, the ECU 21 controls the vehicle actuators 20 so that the vehicle 100 decelerates. In particular, the ECU 21 controls the vehicle actuators 20 so as to make the vehicle 100 decelerate by a deceleration degree less than or equal to a preset upper limit deceleration degree.

Setting of Upper Limit Speed

Figure 5:
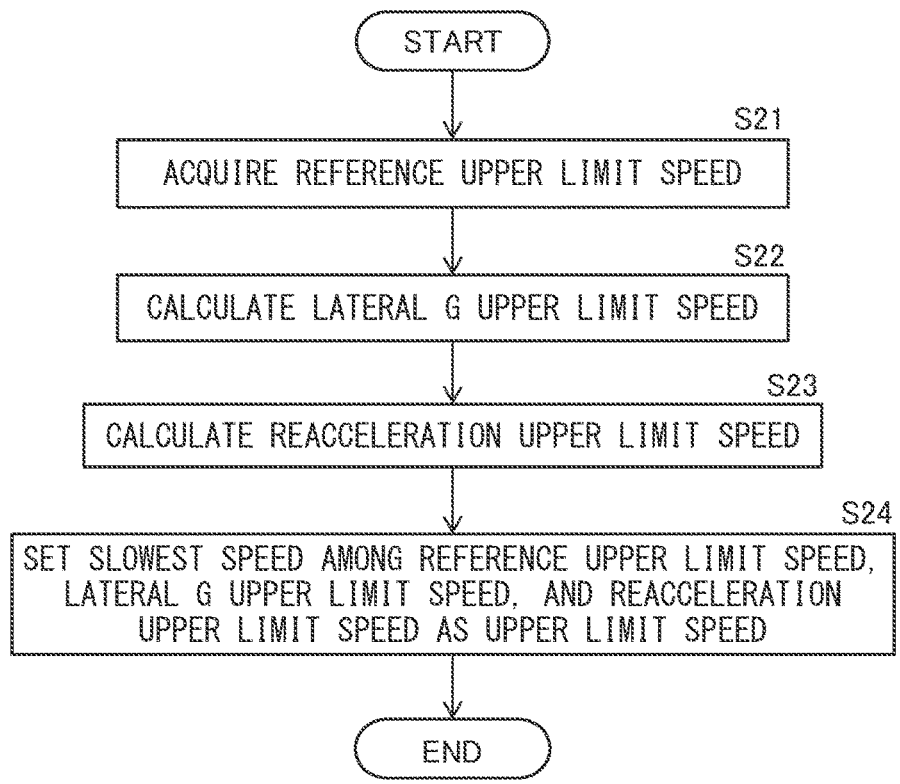
FIG. 5 is a flow chart schematically showing a flow of processing for setting an upper limit speed.

Next, the processing for setting the upper limit speed used in the above-mentioned speed control of the vehicle 100 will be explained. FIG. 5 is a flow chart schematically showing the flow of processing for setting the upper limit speed. The processing for setting the upper limit speed shown in FIG. 5 is performed every constant time interval.

In the processing for setting the upper limit speed, the upper limit speed setting part 334 first acquires a reference upper limit speed (step S21). The "reference upper limit speed" is, for example, a constant speed set in advance by the user through the HMI. The set reference upper limit speed is stored in the storage device 15. The upper limit speed setting part 334 acquires the reference upper limit speed from the storage device 15.

Note that, the reference upper limit speed does not necessarily have to be a constant speed. For example, it may be a speed which changes in accordance with the type of road on which the vehicle 100 is running or the like. In this case, in the storage device 15, a reference upper limit speed is stored for each type of road. Further, the upper limit speed setting part 334 identifies the type of road currently being run on, based on the output of the position measurement sensor 14, the map information and the like stored in the storage device 15, and acquires the reference upper limit speed corresponding to the identified type of road, from the storage device 15.

In the processing for setting the upper limit speed, next, the upper limit speed setting part 334 performs processing for calculating the lateral G upper limit speed (step S22). The "lateral G upper limit speed" is the speed of the vehicle 100 by which the lateral acceleration degree of the vehicle 100 is the upper limit lateral acceleration degree (upper limit of lateral acceleration degree allowed to be applied to the vehicle 100) if the vehicle 100 is running on a curved road. The specific routine of the processing for calculating the lateral G upper limit speed will be explained later (see FIG. 6).

Next, in the processing for setting the upper limit speed, the upper limit speed setting part 334 performs processing for calculating a reacceleration upper limit speed (step S23). Here, in the present embodiment, when the vehicle 100 is running on a connecting road merging with a main road on a motorway or a connecting road branching off from a main road on a motorway (below, these together being referred to simply as a "connecting road") and the vehicle 100 is temporarily decelerated to less than a reacceleration upper limit speed lower than a reference upper limit speed, the upper limit speed setting part 334 then sets the upper limit speed of the vehicle 100 to the reacceleration upper limit speed. At step S23, such a reacceleration upper limit speed is calculated. Note that when the speed of the vehicle 100 has not been temporarily decreased to less than the reacceleration upper limit speed while running on a connecting road, the upper limit speed setting part 334 does not calculate the reacceleration upper limit speed as a result of the processing for calculating the reacceleration upper limit speed. The specific routine of the processing for calculating the reacceleration upper limit speed will be explained later (see FIG. 9).

If the reference upper limit speed is acquired and the lateral G upper limit speed is calculated and, in some cases, the reacceleration upper limit speed is also calculated, the upper limit speed setting part 334 sets the slowest speed among the reference upper limit speed, lateral G upper limit speed, and reacceleration upper limit speed acquired or calculated in this way, as the upper limit speed (step S24). As a result, the target speed of the vehicle 100 is no longer set to a speed faster than the reference upper limit speed, lateral G upper limit speed, or reacceleration upper limit speed.

Note that, in the present embodiment, the upper limit speed of the vehicle 100 is set to the slowest speed among the reference upper limit speed, lateral G upper limit speed, and reacceleration upper limit speed. However, the upper limit speed of the vehicle 100 may also be set to the slower of the reference upper limit speed and the lateral G upper limit speed. In this case, the upper limit speed setting part 334 does not calculate the reacceleration upper limit speed. Alternatively, the upper limit speed of the vehicle 100 may be set to the slower of the lateral G upper limit speed and reacceleration upper limit speed. In this case, the upper limit speed setting part 334 does not acquire the reference upper limit speed. In addition, the upper limit speed of the vehicle 100 may be set to the lateral G upper limit speed. In this case, the upper limit speed setting part 334 does not acquire the reference upper limit speed and does not calculate the reacceleration upper limit speed. Therefore, the upper limit speed setting part 334 basically sets the lateral G upper limit speed as the upper limit speed. Further, when the lateral G upper limit speed is faster than the reference upper limit speed or the reacceleration upper limit speed, the upper limit speed setting part 334 may set the reference upper limit speed or the reacceleration upper limit speed as the upper limit speed.

Further, in the present embodiment, the reference upper limit speed was acquired (step S21), the lateral G upper limit speed was calculated (step S22), and the reacceleration upper limit speed was calculated (step S23) in this order. However, these actions do not necessarily have to be performed in this order. They may be performed in any order or may be performed simultaneously.

Calculation of Lateral G Upper Limit Speed

Figure 6:
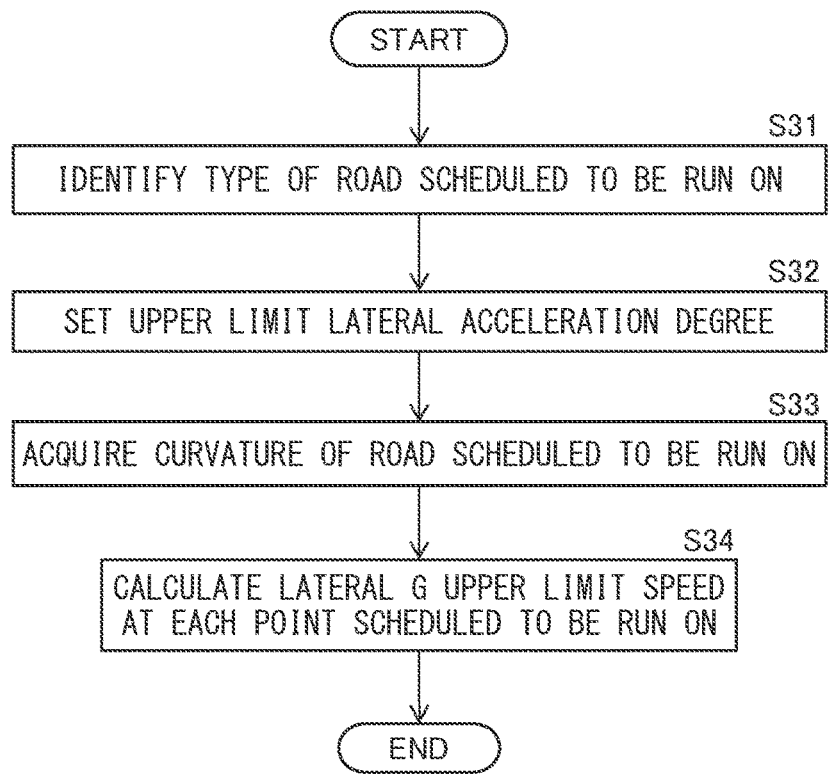
FIG. 6 is a flow chart showing a flow of processing for calculating a lateral G upper limit speed performed at step S22 of FIG. 5.

Next, the processing for calculating the lateral G upper limit speed performed at step S22 of FIG. 5 will be explained. FIG. 6 is a flow chart showing the flow of the processing for calculating the lateral G upper limit speed. The illustrated processing for calculating the lateral G upper limit speed is performed, every time reaching step S22 in the processing for setting the upper limit speed shown in FIG. 5.

In the processing for calculating the lateral G upper limit speed, first, the upper limit lateral acceleration degree setting part 332 identifies the type of the road on which the vehicle 100 is scheduled to run (step S31). As explained above, in the present embodiment, automatic speed control is performed while the vehicle 100 is running on a motorway. Therefore, the upper limit lateral acceleration degree setting part 332 identifies which type of road in the motorway the road on which the vehicle 100 is scheduled to run (below, simply referred to as the "road scheduled to be run on") is. Specifically, the upper limit lateral acceleration degree setting part 332 identifies which of a main road of a motorway or a connecting road of a motorway the road scheduled to be run on is. In addition, when the road scheduled to be run on is a main road of a motorway, the upper limit lateral acceleration degree setting part 332 identifies if a distance to an exit is less than or equal to a predetermined distance. Further, when the road scheduled to be run on is a connecting road of a motorway, the upper limit lateral acceleration degree setting part 332 identifies if that connecting road is a connecting road heading toward an exit of the motorway.

The upper limit lateral acceleration degree setting part 332, for example, compares the self-position information measured by the position measurement sensor 14 against the map information stored in the storage device 15 to thereby identify the type of the road scheduled to be run on. In addition, instead of or in addition to the self-position information and map information, the upper limit lateral acceleration degree setting part 332 may also identify the type of the road scheduled to be run on, based on images generated by the external camera 12. In this case, for example, it may recognize dividing lines in images generated in image recognition processing, and identify the type of the road scheduled to be run on based on the number of lanes as grasped by the recognized dividing lines.

Next, the upper limit lateral acceleration degree setting part 332 sets the upper limit lateral acceleration degree in accordance with the type of the road scheduled to be run on (step S32). When the vehicle 100 is scheduled to run on a curved road, the upper limit lateral acceleration degree is the upper limit value of the lateral acceleration degree which is allowed to be applied to the vehicle 100. If a large lateral acceleration degree is applied to the vehicle 100, the occupants of the vehicle 100 will feel uneasy, therefore the upper limit lateral acceleration degree is basically set to a value whereby the occupants will not feel uneasy. In the present embodiment, the upper limit lateral acceleration degree is a constant value determined in advance for each type of road.

Specifically, in the present embodiment, the upper limit lateral acceleration degree setting part 332 sets the upper limit lateral acceleration degree when the vehicle 100 is running on a connecting road of a motorway lower than the upper limit acceleration degree when the vehicle 100 is running on a main road of a motorway. Specifically, for example, the upper limit lateral acceleration degree when the vehicle 100 is running on a connecting road is set to 0.2 G, while the upper limit lateral acceleration degree when the vehicle 100 is running on a main road is set to 0.3 G.

Here, in general, the narrower the road width, the more likely it is that an occupant will feel uneasy for the same lateral acceleration degree. Further, a connecting road of a motorway is generally narrower in road width compared with a main road. Therefore, when the same lateral acceleration degree is applied to the vehicle 100, an occupant is more likely to feel uneasy when the vehicle 100 is running on a connecting road compared with when the vehicle 100 is running on a main road. In contrast, in the present embodiment, by setting the upper limit lateral acceleration degree when the vehicle 100 is running on a connecting road lower than the upper limit acceleration degree when the vehicle 100 is running on a main road, it is possible to keep the occupants from feeling uneasy when the vehicle 100 is running on a connecting road.

Further, in the present embodiment, the upper limit lateral acceleration degree setting part 332 sets the upper limit lateral acceleration degree when the vehicle 100 is running on a connecting road heading to an exit of the motorway lower than the upper limit lateral acceleration degree when the vehicle 100 is running on a connecting road merging with a main road (that is, a connecting road not heading to an exit of the motorway). Specifically, for example, it sets the upper limit lateral acceleration degree when the vehicle 100 is running on a connecting road heading to an exit of the motorway to about 80% or less of the upper limit lateral acceleration degree when the vehicle 100 is running on a connecting road merging with a main road.

In addition, in the present embodiment, the upper limit lateral acceleration degree setting part 332 sets the upper limit lateral acceleration degree when running on a main road where a distance until an exit of the main road with no connecting road is less than or equal to a predetermined reference distance (that is, a main road near an exit) lower than the upper limit lateral acceleration degree when running on a main road where a distance until an exit of the main road is longer than a reference distance (that is, a main road other than one near an exit). Specifically, it sets the upper limit lateral acceleration degree when running on a main road where a distance until an exit of the main road with no connecting road is less than or equal to a predetermined reference distance to about 80% or less of the upper limit lateral acceleration degree when running on a main road where a distance until an exit of the main road is longer than a reference distance. Note that, the reference distance is a distance at which generally a driver will start decelerating in preparation for exiting the main road, for example, is 300 m.

Here, there is a toll booth at the exit of a motorway, therefore near the exit, it is necessary to make the speed of the vehicle 100 greatly decrease. Further, even if there is no toll booth at the exit of a motorway, it is necessary to make the speed of the vehicle 100 decrease at the ordinary road connected to the exit of the motorway. Therefore, near the exit of a motorway, it is necessary to make the speed of the vehicle 100 decrease. In the present embodiment, it is possible to lower the speed of the vehicle 100 to smoothly match the road situation, by setting the upper limit lateral acceleration degree low when running on a connecting road heading toward an exit of a motorway. Further, when taking over driving at the exit of the motorway, it is possible to more safely transfer driving to the driver by lowering the speed of the vehicle 100 near the exit of the motorway.

If the upper limit lateral acceleration degree is set by the upper limit lateral acceleration degree setting part 332, the road curvature acquiring part 333 acquires the curvature of the road on which the vehicle 100 is scheduled to run (step S33). The road curvature acquiring part 333, for example, acquires the curvature of the road on which the vehicle 100 is scheduled to run from the current point to 300 m ahead. The road scheduled to be run on is, for example, separately calculated by the ECU 21. The road curvature acquiring part 333 acquires the curvature of the road scheduled to be run on from the calculated road scheduled to be run on and map information including information on the curvature of different roads.

Specifically, the ECU 21 calculates the road on which the vehicle 100 is scheduled to be run, based on destination information input through the HMI 16, the surrounding environment of the vehicle 100, the self-position measured by the position measurement sensor 14, and the map information stored in the storage device 15. In particular, in the present embodiment, if the road on which the vehicle 100 is scheduled to be run has a plurality of lanes, the information of the road scheduled to be run on calculated by the ECU 21 may also include information on the lane on which the vehicle 100 is scheduled to run.

The map information stored in the storage device 15 includes curvature information of different points of different roads. In particular, the map information may include curvature information of a lane for each point of each lane, for a road having a plurality of lanes. Whatever the case, the road curvature acquiring part 333 acquires the curvature of the road scheduled to be run on as discrete point group data along the direction of advance of the vehicle 100.

Figure 7:
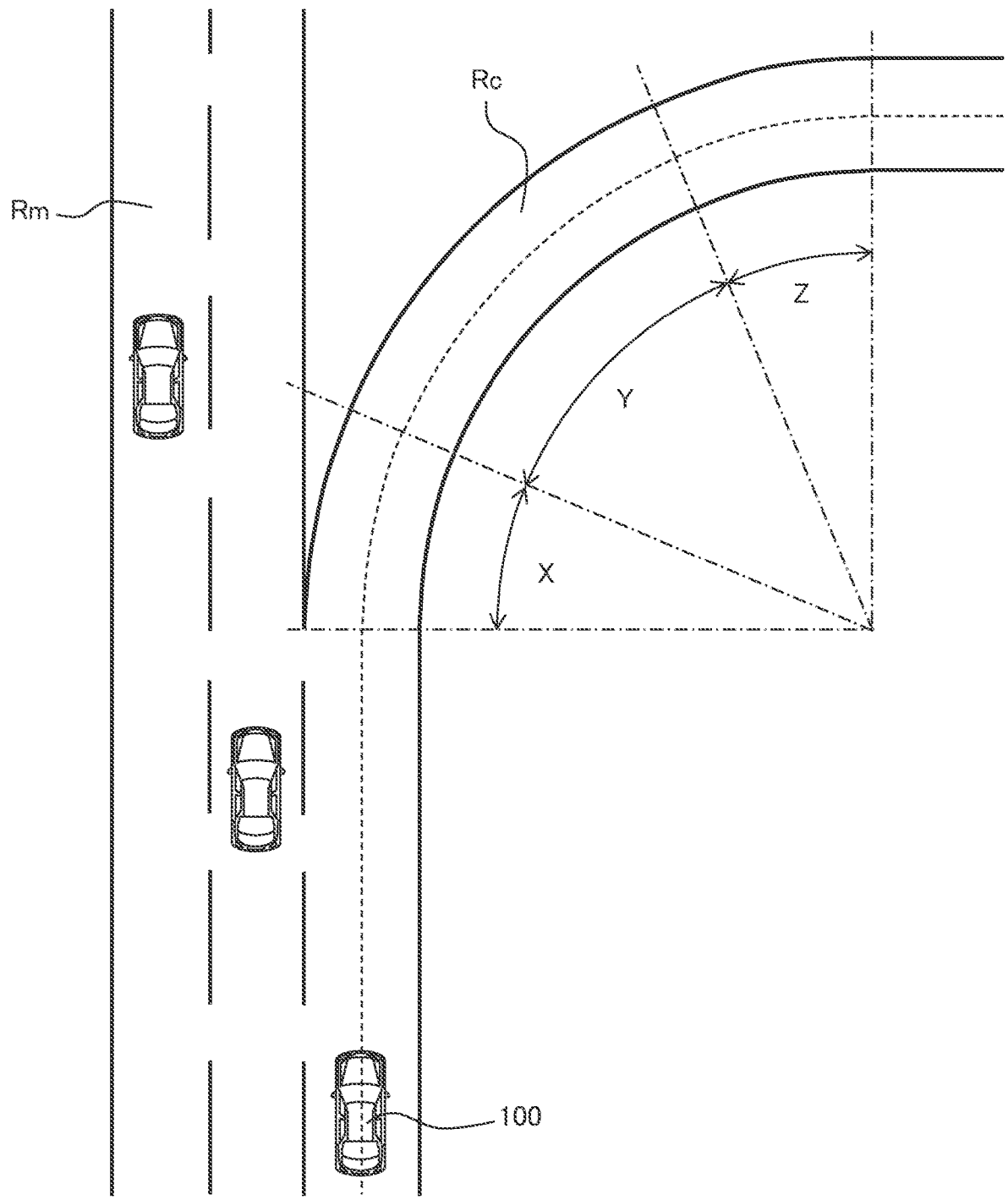
FIG. 7 is a view schematically showing an example of a motorway in which a connecting road is branched from a main road.

FIG. 7 is a view schematically showing an example of a motorway in which a connecting road Rc is branched from a main road Rm. In the example shown in FIG. 7, the connecting road Rc has a curved road of a bend angle of 90 degrees after branching off from the main road Rm. This curved road has a clothoid region X where the curvature gradually becomes greater, a constant curvature region Y where the curvature is maintained constant, and clothoid region Z where the curvature gradually becomes smaller. Therefore, in this case, the road curvature acquiring part 333 discretely acquires the gradually increasing curvature for the clothoid region X, discretely acquires the constant curvature for the constant curvature region Y, and discretely acquires the gradually decreasing curvature for the clothoid region Z.

Note that, in the present embodiment, the road curvature acquiring part 333 acquires the curvature of the road scheduled to be run on, after the upper limit lateral acceleration degree is set by the upper limit lateral acceleration degree setting part 332. However, road curvature acquiring part 333 may also acquire the curvature of the road scheduled to be run on, before the upper limit lateral acceleration degree is set by the upper limit lateral acceleration degree setting part 332 or at the same time as setting the upper limit lateral acceleration degree. Further, in the present embodiment, the road curvature acquiring part 333 acquires the curvature of the road scheduled to be run on. However, the road curvature acquiring part 333 may also acquire the radius of curvature or other curvature parameter as long as the curvature parameter relates to curvature of the road scheduled to be run on. Therefore, in the present embodiment, the lateral G upper limit speed can be said to be calculated based on the value of a curvature parameter of the road scheduled to be run on.

If the upper limit lateral acceleration degree of the vehicle 100 is set and the curvature of the road scheduled to be run on is acquired, the upper limit speed setting part 334 calculates the lateral G upper limit speed at each point on the road scheduled to be run on (step S34). The lateral G upper limit speed at each point on the road scheduled to be run on basically is calculated, based on the curvature of each point of the road scheduled to be run on, so that when the vehicle 100 runs through each point of the road, the lateral acceleration degree of the vehicle 100 becomes the upper limit lateral acceleration degree. Below, referring to FIG. 8, the method of calculating the lateral G upper limit speed at the upper limit speed setting part 334 will be specifically explained.

Figure 8:
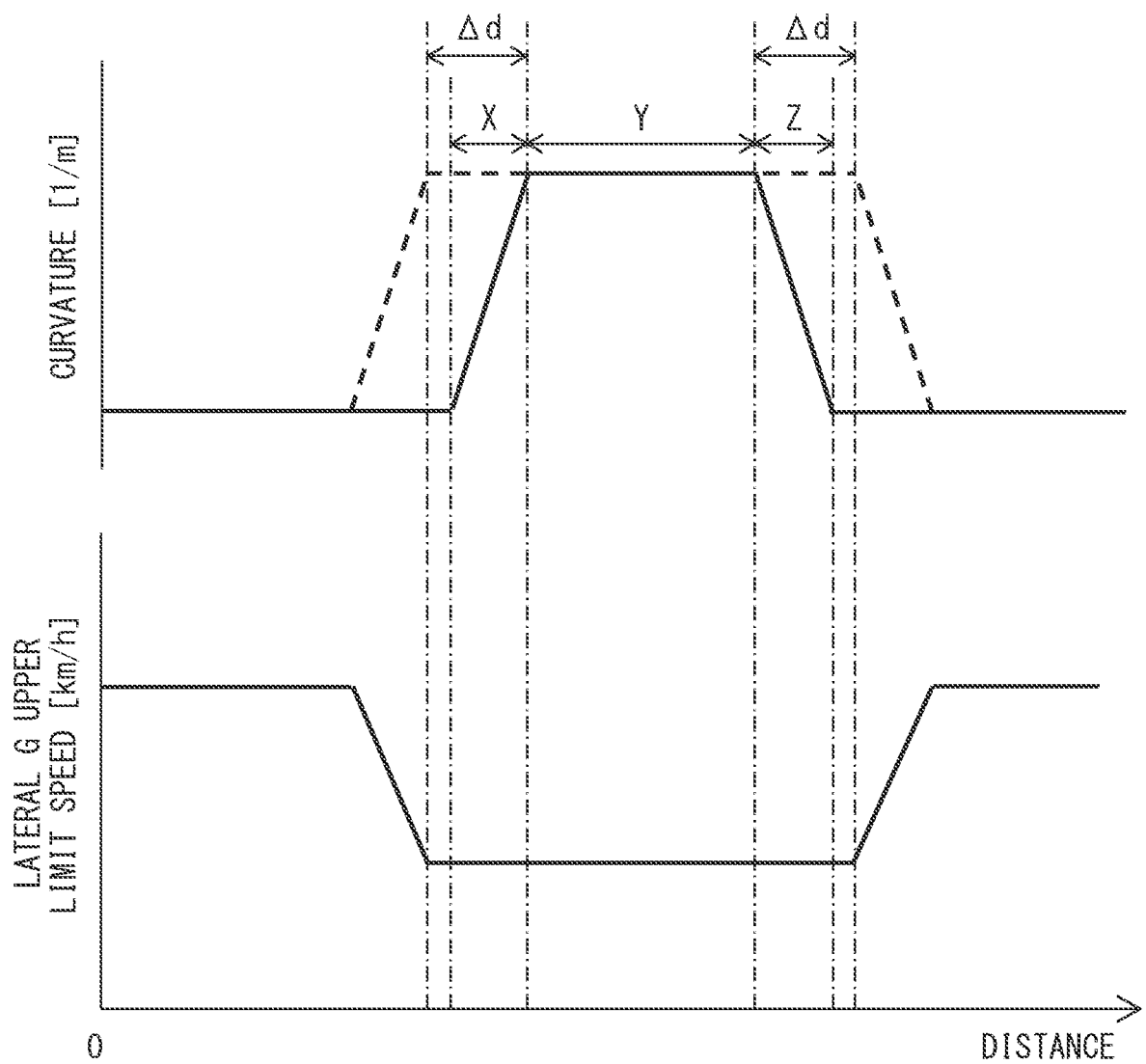
FIG. 8 is a view showing a curvature of a road scheduled to be run on and a lateral G upper limit speed, when a vehicle is scheduled to run on a connecting road such as shown in FIG. 7.

FIG. 8 is a view showing curvature of a road scheduled to be run on and lateral G upper limit speed, when the vehicle 100 is scheduled to run on the connecting road Rc such as shown in FIG. 7. The abscissa of FIG. 8 shows the distance from the current point of the vehicle 100. Regarding the curvature in the figure, the solid line shows the trend in the actual curvature for the current point (trend in curvature acquired by road curvature acquiring part 333). Therefore, the curvature becomes gradually larger at the region X, is maintained constant at the region Y, and becomes gradually smaller at the region Z.

In the present embodiment, when calculating the lateral G upper limit speed, the upper limit speed setting part 334 revises the curvature of the road scheduled to be run on acquired at step S33. Specifically, the upper limit speed setting part 334 revises the curvature of the road scheduled to be run on so that the region where the curvature is greatest in a curved road becomes broader. In the example shown in FIG. 8, the curvature of the road scheduled to be run on is revised so that a region obtained by preset distances Δd added before and after the region Y where the curvature becomes greatest becomes the region where the curvature is greatest in the curved road. As a result, the curvature of the road scheduled to be run on after revision trends as shown by the broken line in FIG. 8.

The lateral G upper limit speed is calculated based on the thus calculated curvature of the road scheduled to be run on after revision and the upper limit lateral acceleration degree of the road scheduled to be run on. For example, the lateral G upper limit speed Vg at each point is made the square root of the value obtained by dividing the upper limit lateral acceleration degree "a" at each point by the curvature "c" after revision of the point ($Vg=(a/c)^{1/2}$). The thus calculated lateral G upper limit speed is shown by the solid line in FIG. 8.

Calculation of Reacceleration Upper Limit Speed

In this regard, when the vehicle 100 is running on a connecting road, the speed control part 331 sometimes makes the speed of the vehicle 100 decrease to less than the reference upper limit speed so as to restrict the lateral acceleration degree of the vehicle 100 while running on a sharply curved road. Further, when the vehicle 100 is running on a connecting road, the speed control part 331 sometimes makes the speed of the vehicle 100 decrease to less than the reference upper limit speed by the vehicle 100 following a slow preceding vehicle in front of the vehicle 100. In the present embodiment, in such cases, even if the sharply curved road changes to a straight road or the slow preceding vehicle is no longer present, the speed control part 331 sets the upper limit speed of the vehicle 100 to less than or equal to a reacceleration upper limit speed lower than the reference upper limit speed. Below, referring to FIG. 9, the method of calculation of the reacceleration upper limit speed will be explained.

FIG. 9 is a flow chart showing a flow of processing for calculating the reacceleration upper limit speed performed at step S23 of FIG. 5. The illustrated processing for calculating the reacceleration upper limit speed is performed each time reaching step S23 in the processing for calculating the upper limit speed shown in FIG. 5.

In the processing for calculating the reacceleration upper limit speed, first, the upper limit speed setting part 334 identifies the type of road on which the vehicle 100 is currently running (step S41). The type of road is identified in the same way as step S31 of FIG. 6, based on, for example, the information of the self-position measured by the position measurement sensor 14 and the map information stored in the storage device 15.

Next, the upper limit speed setting part 334 judges if the vehicle 100 is running on a connecting road, based on the type of road being run on identified at step S41 (step S42). At step S42, if it is judged that the vehicle 100 is not running on a connecting road, that is, is running on a main road, the upper limit speed setting part 334 resets the reacceleration upper limit speed without calculation as the result of the processing for calculating the reacceleration upper limit speed (step S43).

On the other hand, if at step S42 it is judged that the vehicle 100 is running on a connecting road, the upper limit speed setting part 334 calculates the reacceleration upper limit speed (step S44). The "reacceleration upper limit speed" is a predetermined speed lower than the reference upper limit speed. In the present embodiment, the relationship between the type of the road and the reacceleration upper limit speed is stored in advance in the storage device 15. Further, the upper limit speed setting part 334 calculates the reacceleration upper limit speed, based on the type of the road being run on identified at step S41 and the relationship stored in the storage device.

In particular, in the present embodiment, the reacceleration upper limit speed when the vehicle 100 is running on a connecting road heading to an exit of a motorway is calculated lower than the reacceleration upper limit speed when the vehicle 100 is running on a connecting road merging with a main road. Here, as explained above, near the exit of a motorway, it is necessary to make the speed of the vehicle 100 decrease. According to the present embodiment, by calculating the reacceleration upper limit speed low when the vehicle 100 is running on a connecting road heading to an exit of a motorway, it is possible to lower the speed of the vehicle 100 to smoothly match the road situation.

Next, the upper limit speed setting part 334 judges if the speed of the vehicle 100 has been decreased until becoming less than the reacceleration upper limit speed (step S45). The speed of the vehicle 100 is, for example, detected by the running condition sensor 11 of the vehicle 100. If at step S45 it is judged that the speed of the vehicle 100 is greater than or equal to the reacceleration upper limit speed, that is if it is judged that the vehicle 100 has not been decelerated that much on the connecting road, the upper limit speed setting part 334 resets the reacceleration upper limit speed without calculation as the result of the processing for calculating the reacceleration upper limit speed (step S43). Therefore, when the speed of the vehicle 100 is greater than or equal to the reacceleration upper limit speed, the reacceleration upper limit speed is not set. Accordingly, at step S24 of FIG. 5, the slower speed of the reference upper limit speed and the lateral G upper limit speed is set as the upper limit speed.

On the other hand, if at step S45 it is judged that the speed of the vehicle 100 is less than the reacceleration upper limit speed, the upper limit speed setting part 334 maintains the reacceleration upper limit speed, without reset, as the value calculated at step S44. Therefore, in this case, at step S24 of FIG. 5, the slowest speed among the reference upper limit speed, lateral G upper limit speed, and reacceleration upper limit speed is set as the upper limit speed. As a result, in the present embodiment, if the vehicle is decelerated while running on a connecting road until the lateral acceleration degree becomes less than the reacceleration upper limit speed, then is again accelerated, when the lateral G upper limit speed is faster than this reacceleration upper limit speed, the reacceleration upper limit speed is set as the upper limit speed.

Here, in general, when a vehicle 100 enters a connecting road from a main road, the speed of the vehicle 100 is relatively fast. The speed gradually becomes slower as the vehicle 100 runs on the connecting road. For this reason, if the speed of the vehicle 100 once becomes slower while running on a connecting road, the driver will feel something is wrong if the vehicle 100 accelerates to the original speed. According to the present embodiment, if the speed of the vehicle 100 once becomes slower due to some sort of issue while running on a connecting road, even if that issue is later resolved, the speed of the vehicle 100 while running on the connecting road will never return to the original speed, therefore the driver is kept from feeling something is wrong.

Note that, in the above embodiment, the upper limit speed setting part 334 judges at step S44 if the speed of the vehicle 100 has been decreased down to less than the reacceleration upper limit speed. However, the upper limit speed setting part 334 may also judge at step S44 if the speed has been decreased down to less than a predetermined speed lower than the reacceleration upper limit speed. Due to this, hysteresis can be imparted.

Further, the upper limit speed setting part 334 may judge at step S44 if the speed of the vehicle 100 has been decreased down to less than a multilevel reacceleration upper limit speed and, if judging that it has been decreased to less than the multilevel reacceleration upper limit speed, may set the reacceleration upper limit speed in multiple levels. For example, if the speed of the vehicle 100 is decreased down to a speed less than a first speed and greater than or equal to a second speed, the upper limit speed setting part 334 may set the reacceleration upper limit speed to the first speed, if the speed of the vehicle 100 is decreased down to a speed less than the second speed and greater than or equal to a third speed, it may set the reacceleration upper limit speed to the second speed, and if the speed of the vehicle 100 is decreased down to less than the third speed, it may set the reacceleration upper limit speed to the third speed.

Action and Effects

As explained above, an occupant is likely to feel more uneasy as the road width become narrower even with the same lateral acceleration degree. Further, a connecting road of a motorway is generally narrower in road width compared with a main road. In the present embodiment, the upper limit lateral acceleration degree when a vehicle 100 is running on a connecting road is set lower than an upper limit acceleration degree when the vehicle 100 is running on a main road so as to enable an occupant to be kept from feeling uneasy when the vehicle 100 is running on a connecting road. Therefore, according to the present embodiment, it is possible to control the speed of a vehicle so that the lateral acceleration degree of the vehicle is suitable regardless of the type of road on which the vehicle is running.

Above, preferred embodiments according to the present invention were explained, but the present invention is not limited to these embodiments and can be modified and changed in various ways within the language of the claims.

The invention claimed is:
1. An automatic speed control device for automatically controlling a speed of a vehicle, the automatic speed control device comprising a processor,
the processor is configured to:
set an upper limit lateral acceleration degree which is an upper limit value of a lateral acceleration degree allowed while the vehicle is running;
acquire a value of a curvature parameter relating to curvature of a road on which the vehicle is scheduled to run;
calculate a speed of the vehicle at which if the vehicle runs on that road, the lateral acceleration degree of the vehicle becomes the upper limit lateral acceleration degree, based on the curvature parameter of the road, and setting the calculated speed as the upper limit speed; and
control the speed of the vehicle to be less than or equal to the upper limit speed, wherein
the upper limit lateral acceleration degree setting part sets the upper limit lateral acceleration degree when the vehicle is running on a connecting road merging with a main road of a motorway or a connecting road branching off from a main road, lower than the upper limit lateral acceleration degree when the vehicle is running on a main road of a motorway, and the processor is configured to:
set a predetermined reference upper limit speed as an upper limit speed when a speed of the vehicle corresponding to the upper limit lateral acceleration degree is faster than the reference upper limit speed, and if, while running on the connecting road, the vehicle is decelerated until the lateral acceleration degree becomes less than a predetermined reacceleration upper limit speed, then is reaccelerated, set the reacceleration upper limit speed as an upper limit speed when a speed of the vehicle corresponding to the upper limit lateral acceleration degree is faster than the reacceleration upper limit speed, and the reacceleration upper limit speed is lower than the reference upper limit speed.

2. The automatic speed control device according to claim 1, wherein the vehicle is a vehicle in which automatic control of the speed of the vehicle is stopped at an exit of a motorway, and the processor is configured to set the reacceleration upper limit speed when the vehicle is running on a connecting road heading toward the exit, lower than the reacceleration upper limit speed when the vehicle is running on a connecting road merging with a main road.

3. The automatic speed control device according to claim 1, wherein the vehicle is a vehicle in which automatic control of the speed of the vehicle is stopped at an exit of a motorway, and the processor is configured to set the upper limit lateral acceleration degree when the vehicle is running on a connecting road heading toward the exit, lower than the upper limit lateral acceleration degree when the vehicle is running on a connecting road merging with a main road.

4. The automatic speed control device according to claim 1, wherein the processor is configured to set the upper limit lateral acceleration degree when the vehicle is running on a main road where a distance until the main road exit with no connecting road is less than or equal to the predetermined distance, lower than the upper limit lateral acceleration degree when the vehicle is running on a main road where a distance until the main road exit is longer than the predetermined distance.

5. An automatic speed control method for automatically controlling a speed of a vehicle, the automatic speed control method comprising:

setting an upper limit lateral acceleration degree which is an upper limit value of a lateral acceleration degree allowed while the vehicle is running;

acquiring a value of a curvature parameter relating to curvature of a road on which the vehicle is scheduled to run;

calculating a speed of the vehicle at which if the vehicle runs on that road, the lateral acceleration degree of the vehicle becomes the upper limit lateral acceleration degree, based on the curvature parameter of the road, and setting the calculated speed as the upper limit speed; and controlling the speed of the vehicle to be less than or equal to the upper limit speed, wherein the upper limit lateral acceleration degree when the vehicle is running on a connecting road merging with a main road of a motorway or a connecting road branching off from a main road is lower than the upper limit lateral acceleration degree when the vehicle is running on a main road of a motorway, a predetermined reference upper limit speed is set as an upper limit speed when a speed of the vehicle corresponding to the upper limit lateral acceleration degree is faster than the reference upper limit speed, if, while running on the connecting road, the vehicle is decelerated until the lateral acceleration degree becomes less than a predetermined reacceleration upper limit speed, then is reaccelerated, the reacceleration upper limit speed is set as an upper limit speed when a speed of the vehicle corresponding to the upper limit lateral acceleration degree is faster than the reacceleration upper limit speed, and the reacceleration upper limit speed is lower than the reference upper limit speed.

6. A non-transitory computer medium having recorded thereon a computer program for automatically controlling a speed of a vehicle, the computer program causing a computer to execute a process comprising:

setting an upper limit lateral acceleration degree which is an upper limit value of a lateral acceleration degree allowed while the vehicle is running;

acquiring a value of a curvature parameter relating to curvature of a road on which the vehicle is scheduled to run;

calculating a speed of the vehicle at which if the vehicle runs on that road, the lateral acceleration degree of the vehicle becomes the upper limit lateral acceleration degree, based on the curvature parameter of the road, and setting the calculated speed as the upper limit speed; and controlling the speed of the vehicle to be less than or equal to the upper limit speed, wherein the upper limit lateral acceleration degree when the vehicle is running on a connecting road merging with a main road of a motorway or a connecting road branching off from a main road is lower than the upper limit lateral acceleration degree when the vehicle is running on a main road of a motorway, a predetermined reference upper limit speed is set as an upper limit speed when a speed of the vehicle corresponding to the upper limit lateral acceleration degree is faster than the reference upper limit speed, if, while running on the connecting road, the vehicle is decelerated until the lateral acceleration degree becomes less than a predetermined reacceleration upper limit speed, then is reaccelerated, the reacceleration upper limit speed is set as an upper limit speed when a speed of the vehicle corresponding to the upper limit lateral acceleration degree is faster than the reacceleration upper limit speed, and the reacceleration upper limit speed is lower than the reference upper limit speed.

* * * * *